(12) United States Patent
Sung et al.

(10) Patent No.: US 10,878,630 B2
(45) Date of Patent: Dec. 29, 2020

(54) THREE-DIMENSIONAL IMAGE DISPLAY DEVICE AND METHOD

(71) Applicant: SAMSUNG ELECTRONICS CO., LTD., Suwon-si (KR)

(72) Inventors: Geeyoung Sung, Daegu (KR); Yuntae Kim, Suwon-si (KR); Changkun Lee, Seoul (KR); Hongseok Lee, Seoul (KR)

(73) Assignee: SAMSUNG ELECTRONICS CO.. LTD., Suwon-si (KR)

(*) Notice: Subject to any disclaimer, the term of this patent is extended or adjusted under 35 U.S.C. 154(b) by 0 days.

(21) Appl. No.: 16/237,063

(22) Filed: Dec. 31, 2018

(65) Prior Publication Data
US 2020/0035027 A1 Jan. 30, 2020

(30) Foreign Application Priority Data
Jul. 30, 2018 (KR) .................... 10-2018-0088674

(51) Int. Cl.
*H04N 13/383* (2018.01)
*G02B 3/14* (2006.01)
*G06T 19/00* (2011.01)
*G02B 30/25* (2020.01)
*G06F 3/01* (2006.01)
*G06T 15/20* (2011.01)

(52) U.S. Cl.
CPC .............. *G06T 19/006* (2013.01); *G02B 3/14* (2013.01); *G02B 30/25* (2020.01); *G06F 3/013* (2013.01); *G06T 15/20* (2013.01); *H04N 13/383* (2018.05)

(58) Field of Classification Search
CPC .................................................... G06T 19/006
USPC ........................................................... 348/54
See application file for complete search history.

(56) References Cited

U.S. PATENT DOCUMENTS

| 9,304,319 | B2 | 4/2016 | Bar-Zeev et al. |
| 9,392,218 | B2 | 7/2016 | Guo et al. |
| 9,576,399 | B2 | 2/2017 | Lo et al. |

(Continued)

FOREIGN PATENT DOCUMENTS

| EP | 3 270 233 A1 | 1/2018 |
| KR | 10-2017-0032736 A | 3/2017 |
| KR | 10-1717379 B1 | 3/2017 |

OTHER PUBLICATIONS

Communication dated Sep. 17, 2019 issued by the European Intellectual Property Office in counterpart European Application No. 19157825.1.

(Continued)

*Primary Examiner* — Amir Shahnami
(74) *Attorney, Agent, or Firm* — Sughrue Mion, PLLC

(57) ABSTRACT

A three-dimensional (3D) image display device includes a display device; a variable focus optical system configured to focus the 3D image formed by the display device on a reference plane, a processor configured to determine a representative depth value of the 3D image by selecting a depth position, from among a plurality of depth positions corresponding to the 3D image, as the representative depth value, and control the variable focus optical system to adjust the reference plane by adjusting a focal point of the variable focus optical system based on the representative depth value; and a transfer optical system configured to transfer the 3D image focused on the reference plane to a pupil of an observer.

26 Claims, 6 Drawing Sheets

(56) References Cited

U.S. PATENT DOCUMENTS

| | | | |
|---|---|---|---|
| 9,726,891 B2 | 8/2017 | Webster et al. | |
| 9,892,545 B2 | 2/2018 | Benko et al. | |
| 2009/0161989 A1* | 6/2009 | Sim | H04N 19/597 382/285 |
| 2011/0126159 A1* | 5/2011 | Ko | H04N 13/361 715/848 |
| 2012/0113231 A1* | 5/2012 | Kim | H04N 13/239 348/47 |
| 2012/0127155 A1* | 5/2012 | Deshpande | H04N 13/128 345/419 |
| 2015/0346495 A1 | 12/2015 | Welch et al. | |
| 2016/0133025 A1* | 5/2016 | Wang | G06K 9/00369 348/135 |
| 2016/0161740 A1 | 6/2016 | Bar-Zeev et al. | |
| 2017/0069071 A1* | 3/2017 | Jung | G06K 9/00201 |
| 2017/0102545 A1 | 4/2017 | Hua et al. | |
| 2017/0236255 A1 | 8/2017 | Wetzstein et al. | |
| 2017/0293145 A1 | 10/2017 | Miller et al. | |
| 2017/0319051 A1 | 11/2017 | Kuriyama | |
| 2017/0345220 A1 | 11/2017 | Bates | |
| 2018/0035103 A1* | 2/2018 | Sung | G02B 27/2278 |
| 2018/0275410 A1* | 9/2018 | Yeoh | G02B 27/0093 |
| 2019/0324271 A1 | 10/2019 | Lee et al. | |
| 2020/0004018 A1 | 1/2020 | Lee et al. | |
| 2020/0033615 A1 | 1/2020 | Kim et al. | |

OTHER PUBLICATIONS

Xinda Hu et al., "High-resolution optical see-through multi-focalplane head-mounted display using freeform optics", May 30, 2014, Optics Express vol. 22, Issue 11, 8 pages total.

Chang-Kun Lee et al., "Compact three-dimensional head-mounted display system with Savart plate", Aug. 22, 2016, Optics Express, vol. 24, No. 17, 14 pages total.

* cited by examiner

THREE-DIMENSIONAL IMAGE DISPLAY DEVICE AND METHOD

CROSS-REFERENCE TO RELATED APPLICATION

This application claims priority to Korean Patent Application No. 10-2018-0088674, filed on Jul. 30, 2018, in the Korean Intellectual Property Office, the disclosure of which is incorporated herein in its entirety by reference.

BACKGROUND

1. Field

Example embodiments consistent with the present disclosure relates to three-dimensional (3D) image display device and method.

2. Description of the Related Art

Recently, 3D image display technology has been applied to various fields, including image display apparatuses related to a virtual reality (VR) display and an augmented reality (AR) display.

For example, a head mount display that provides VR display is currently in the commercialization stage and is widely applied to the entertainment industry. In addition, the head mount display is developing into a form that may be applied to medical, education and industrial fields.

An AR display, which is an advanced form of the VR display, is an image display apparatus that combines the real world and VR and has a characteristic that may lead to the interaction between reality and virtuality. The interaction between the real world and VR is based on the ability to provide real-time information about a real situation and may further increase an effect of reality by overlapping a virtual object or information on a real world environment.

In the related art AR display apparatuses and VR display apparatuses, a stereoscopy technique is usually used for the 3D image display, where visual fatigue may be involved due to a vergence-accommodation mismatch. Accordingly, a 3D image display method capable of reducing visual fatigue has been researched.

SUMMARY

Provided are 3D image display apparatuses and methods capable of reducing visual fatigue.

Additional aspects will be set forth in part in the description which follows and, in part, will be apparent from the description, or may be learned by practice of the embodiments of the disclosure.

According to an aspect of the disclosure, there is provided a three-dimensional (3D) image display device comprising: a display device configured to modulate light according to 3D image information to form a 3D image; a variable focus optical system configured to focus the 3D image formed by the display device on a reference plane; a processor configured to determine a representative depth value of the 3D image by selecting a depth position, from among a plurality of depth positions corresponding to the 3D image, as the representative depth value, and control the variable focus optical system to adjust the reference plane by adjusting a focal point of the variable focus optical system based on the representative depth value; and a transfer optical system configured to transfer the 3D image focused on the reference plane to a pupil of an observer.

The processor maybe further configured to determine the representative depth value based on a depth map and a color map of the 3D image.

The processor maybe further configured to quantize depth values included in the depth map into a plurality of quantized values and select at least one of the plurality of quantized values as the representative depth value.

The processor maybe further configured to determine the representative depth value based on saliency information from the color map.

The processor maybe further configured to determine the representative depth value based content in the color map.

The processor maybe further configured to determine a zone range in which a single image is recognized by binocular vergence according to a focal distance and determine the representative depth value based on the zone range.

The variable focus optical system may comprise at least one lens adjusted along an optical axis based on the representative depth value such that a distance between the at least one lens and the display device is adjusted.

The variable focus optical system may comprise at least one lens having a variable curvature.

The transfer optical system maybe configured to transfer the 3D image focused on the reference plane to the pupil of the observer together with a real environment image in front of the observer.

The transfer optical system may comprise a path converting member configured to deflect a path of the 3D image focused on the reference plane in a direction toward the pupil of the observer.

The path converting member may comprise a material configured to transmit a real environment image in front of the observer.

The path converting member may comprise a half mirror.

The 3D image display device maybe a wearable see-through type display device.

According to another aspect of the disclosure, there is provided a three-dimensional (3D) image display method comprising: modulating light according to 3D image information to form a 3D image; focusing, by a variable focus optical system, the 3D image formed on a reference plane; determining a representative depth value of the 3D image by selecting a depth position, from among a plurality of depth positions corresponding to the 3D image, as the representative depth value; adjusting the reference plane by adjusting a focal point of the variable focus optical system based on the representative depth value; and transfer the 3D image focused on the reference plane to a pupil of an observer.

The selecting of the representative depth value may comprise determining the representative depth value based on a depth map and a color map of the 3D image.

The determining of the representative depth value may further comprise: quantizing depth values included in the depth map into a plurality of quantized values; and selecting at least one of the plurality of values as the representative depth value.

The determining of the representative depth value may further comprise determining the representative depth value based on saliency information from the color map.

The determining of the representative depth value may further comprise: determining the representative depth value based on content in the color map.

The determining of the representative depth value may further comprise: determining a zone range in which a single image is recognized by binocular vergence according to a focal distance; and determining the representative depth value based on the zone range.

The adjusting of the variable focus optical system may comprise adjusting positions of at least one lens in an optical axis or adjusting curvatures of the at least one lens.

According to another aspect of the disclosure, there is provided a three-dimensional (3D) image display device comprising: a processor configured to: receive image information to form a 3D image, the image information including a color map of the 3D image; determine a representative depth value of the 3D image based on the color map of the 3D image, and generate a signal to control a variable focus optical system to adjust a reference plane based on the representative depth value.

The processor maybe further configured to determine the representative depth value by selecting a depth position, from among a plurality of depth positions corresponding to the 3D image, as the representative depth value based on visual concentration information from the color map.

The processor maybe further configured to: determine a first zone in the color map of the image having a higher visual concentration than a second zone in the color map of the image as a representative zone, and determine the representative depth value by selecting a depth position, from among a plurality of depth positions corresponding to the 3D image, corresponding to the representative zone as the representative depth value.

The processor maybe further configured to: determine a plurality of zones of comfort (ZOC) based on a relationship between vergence and focal distance corresponding to the 3D image; wherein the determining the representative depth value comprises determining a first representative depth value for a first ZOC and a second representative depth value for a second ZOC.

According to another aspect of the disclosure there is provided a three-dimensional (3D) image display method comprising: receiving image information to form a 3D image, the image information including a color map of the 3D image; determining a representative depth value of the 3D image based on the color map of the 3D image, and generating a signal to control a variable focus optical system to adjust a reference plane based on the representative depth value.

The determining the representative depth value may comprise selecting a depth position, from among a plurality of depth positions corresponding to the 3D image, as the representative depth value based on visual concentration information from the color map.

The 3D image display method may further comprise determining a first zone in the color map of the image having a higher visual concentration than a second zone in the color map of the image as a representative zone, and determining the representative depth value by selecting a depth position, from among a plurality of depth positions corresponding to the 3D image, corresponding to the representative zone as the representative depth value.

The 3D image display method may further comprise determining a plurality of zones of comfort (ZOC) based on a relationship between vergence and focal distance corresponding to the 3D image; wherein the determining the representative depth value comprises determining a first representative depth value for a first ZOC and a second representative depth value for a second ZOC.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
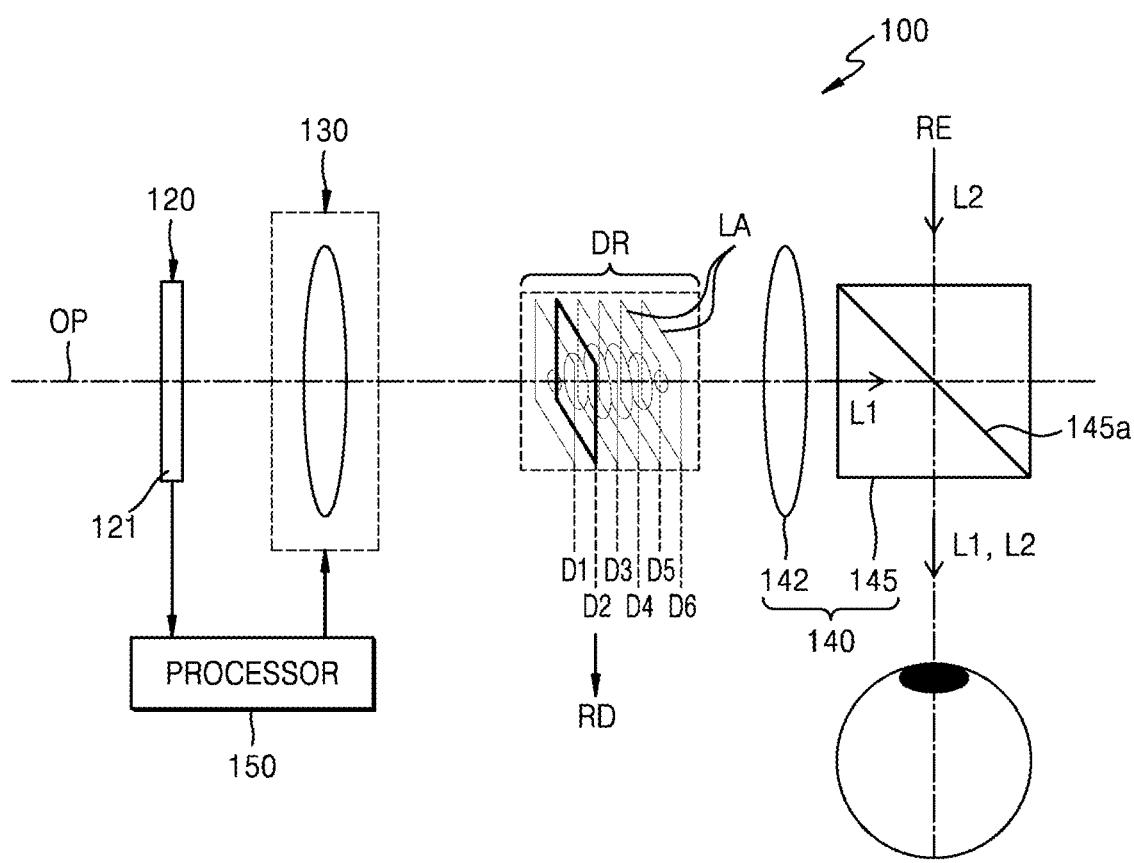
FIG. 1 is a diagram showing an optical arrangement of a three-dimensional (3D) image display device according to an example embodiment.

Example embodiments will now be described in detail with reference to the accompanying drawings, wherein like reference numerals refer to like elements throughout. In this regard, the present example embodiments may have different forms and should not be construed as being limited to the descriptions set forth herein. Accordingly, the example embodiments are described below, by referring to the figures, to explain aspects. As used herein, the term "and/or" includes any and all combinations of one or more of the associated listed items.

In the drawings, the sizes of elements may be exaggerated for clarity of illustration. The example embodiments described herein are for illustrative purposes only, and various modifications may be made therein.

In the following description, when an element is referred to as being "above" or "on" another element, it may be directly on the other element while making contact with the other element or may be above the other element without making contact with the other element.

As used herein, the singular forms "a," "an" and "the" are intended to include the plural forms as well, unless the context clearly indicates otherwise. It will be further understood that the terms "comprises" and/or "comprising" used herein specify the presence of stated features or elements, but do not preclude the presence or addition of one or more other features or elements.

An element referred to with the definite article or a demonstrative pronoun may be construed as the element or the elements even though it has a singular form.

Operations of a method may be performed in appropriate order unless explicitly described in terms of order or described to the contrary. That is, operations are not limited to the order in which the operations are described. In the present disclosure, examples or exemplary terms (for example, "such as" and "etc.") are used for the purpose of description and are not intended to limit the scope of the inventive concept unless defined by the claims.

Figure 2:
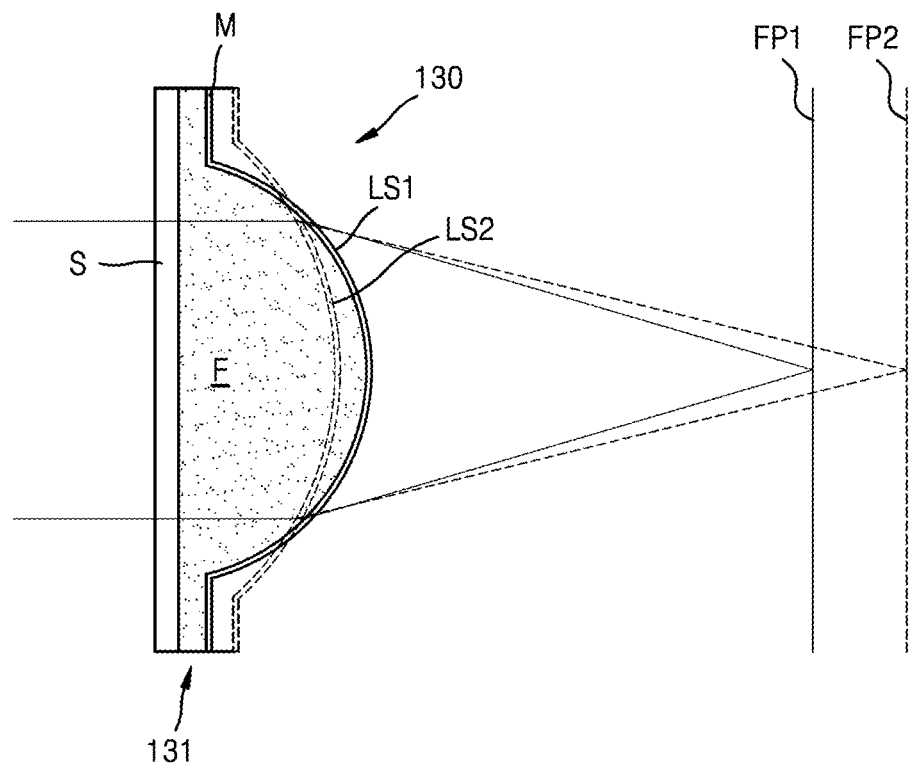
FIG. 2 illustrates an example in which a reference plane position is adjusted by a variable focus optical system included in the 3D image display device of FIG. 1.
Figure 3:
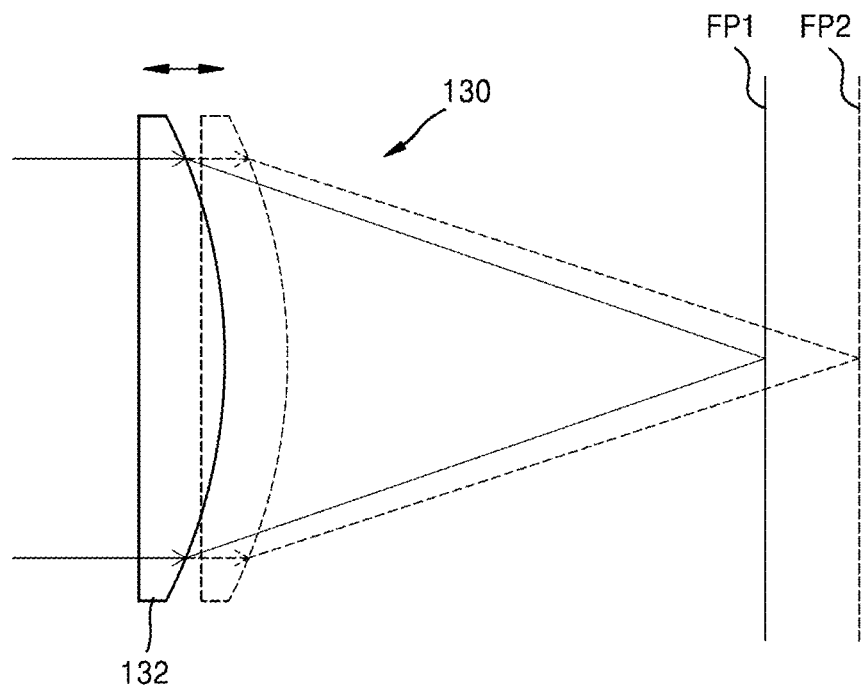
FIG. 3 illustrates another example in which a reference plane position is adjusted by the variable focus optical system included in the 3D image display device of FIG. 1.

FIG. 1 is a diagram illustrating an optical arrangement of a 3D image display device 100 according to an example embodiment. FIGS. 2 and 3 illustrate examples of a variable focus optical system 130 provided in the 3D image display device 100 of FIG. 1.

The 3D image display device 100 may include an image forming optical system 120 that includes a display device 121 that modulates light to form an image, the variable focus optical system 130 that focuses an image formed by the display device 121 on a reference plane, a processor 150 that controls a focal position of the variable focus optical system 130 such that the reference plane is variable, and a transfer optical system 140 that transfers the image focused on the reference plane to an observer's pupil. According to an example embodiment, the reference plane may be predetermined.

The display device 121 may modulate light according to 3D image information to be displayed to an observer to form an image. The image formed by the display device 121 may be, for example, a stereo image provided to each of the left and right eyes of the observer. In the drawings, only an optical system facing a single eye is shown for convenience of illustration. The image formed by the display device 121 is not limited thereto and may be a hologram image, a light field image, an integral photography (IP) image, or the like, and may also include a multi-view or super multi-view image.

The display device 121 may include, for example, a liquid crystal on silicon (LCoS) device, a liquid crystal display (LCD) device, an organic light emitting diode (OLED) display device, a digital micromirror device (DMD), and may also include a next generation device such as a micro LED, a quantum dot (QD) LED, etc.

The image forming optical system 120 may include a light source providing light for forming an image on the display device 121. In addition, the image forming optical system 120 may further include a beam splitter for adjusting an optical path, a relay lens for zooming in and out an image, a spatial filter for removing noise, and the like.

The 3D image display device 100 according to an example embodiment may include the variable focus optical system 130 for reducing visual fatigue as a configuration for a multi-depth representation. For example, even in the case of a stereoscopy method of recognizing a 3D image by using parallax of the left and right eyes, a position of the reference plane on which left and right eye images are focused may be varied according to depth information included in the image, and thus, visual fatigue may be reduced.

The variable focus optical system 130 may display an image on a plurality of depth positions according to depth information included in a 3D image to be displayed. The variable focus optical system 130 may have a configuration that the focal position varies such that the image formed by the display device 121 is focused on the reference plane and the position of the reference plane is adjusted. The variable focus optical system 130 may vary the position of the reference plane within a depth range DR. According to an example embodiment, the depth range DR may be predetermined. As shown, a plurality of layers LA within the depth range DR may include images corresponding to depth information on reference planes at different positions. The 3D image display device 100 according to an example embodiment may focus an image only on a reference plane of a position D2 selected as a representative depth RD among depth positions D1 to D6 of the reference plane on which the plurality of layers LA are placed. One representative depth position may be selected with respect to an image of one frame as shown. Alternatively, a plurality of representative depth positions may be selected according to images. For example, when depth representation is difficult with only one representative depth, a plurality of representative depth positions may be selected. Even in this case, the number of representative depth positions is selected as the minimum number as will be described later.

Unlike the example embodiment, when all layers related to depth information included in one image frame are displayed, the configuration and operation of the system become complicated and the data throughput increases. For example, when a plurality of layers are displayed using one display device, the plurality of layers may be time sequentially displayed in synchronism with the focus change of the variable focus optical system 130, that is, by a time-division method. In this case, high-speed variable focus devices and display devices in proportional to the number of layers are required. Alternatively, a space-division method may be used. In this case, a plurality of display devices corresponding to the number of depth positions need to be provided, which may increase the size of the system.

The 3D image display device 100 according to an example embodiment may drive the variable focus optical system 130 to select the representative depth and form the reference plane at the corresponding position. Accordingly, a 3D image with reduced visual fatigue may be implemented with a simple configuration. Also, since the representative depth for representing multi-depths is determined through image analysis, an eye tracking sensor for tracking a focus position viewed by the observer is unnecessary and thus the system configuration may be simplified.

The variable focus optical system 130 may include one or more lenses. The one or more lenses may be configured to vary a curvature or move along an optical axis OP, thereby varying a position on which an incident image is focused. Although only one lens is shown in the variable focus optical system 130, this is for convenience, and one or more lenses and a motor or an actuator for providing driving force to the lenses may be provided.

FIG. 2 illustrates an example in which a reference plane position is adjusted by the variable focus optical system 130 included in the 3D image display device 100 of FIG. 1.

The variable focus optical system 130 may include a curvature variable lens 131 in which a curvature of a lens surface is adjusted. The curvature variable lens 131 may be a liquid lens in which a shape of the lens surface is controlled under electrical control. The curvature variable lens 131 may include a translucent substrate S and an optical membrane M forming the lens surface. An optical fluid F may be filled in a space between the translucent substrate S and the optical membrane M. The curvature variable lens 131 may be controlled by a controller (not shown) that controls the flow of the optical fluid F. According to an example embodiment, the curvature variable lens 131 may include the controller. The optical membrane M may be formed of a transparent and elastic material such that the shape of the lens surface formed by the optical membrane M changes according to the flow of the optical fluid F, and thus, a focal length changes. For example, when the optical membrane M has a first lens surface LS1, a focal plane may be formed at a position FP1, and when the optical membrane M has a second lens surface LS2, the focal plane may be formed at a position FP2. The position of the focal plane may be set according to a selected representative depth and may be adjusted by controlling the flow of the optical fluid F such that a proper lens surface is formed.

FIG. 3 illustrates another example in which a reference plane position is adjusted by driving the variable focus optical system 130 of another example included in the 3D image display device 100 of FIG. 1.

The variable focus optical system 130 may include a driving lens 132 that moves in an optical axis direction. The driving lens 132 may be controlled by a driver (not shown) to move in parallel in the optical axis direction. According to a position of the driving lens 132, for example, a focal plane may be formed at the position FP1 or FP2 as shown. The position of the focal plane may be set according to a selected representative depth and may be adjusted by controlling a movement distance of the driving lens 132 to move to a proper position.

FIGS. 2 and 3 illustrate the examples in which the variable focus optical system 130 includes one curvature variable lens 131 and one driving lens 132, respectively. However, the present disclosure is not limited thereto. A variable focus may also be implemented with a plurality of lenses. Also, the shape of the curvature variable lens 131 is not limited to the illustrated liquid lens shape, and various shapes capable of controlling the curvature of the lens surface may be employed.

Referring again to FIG. 1, the transfer optical system 140 may transfer the image focused on the reference plane to the observer's pupil. The transfer optical system 140 may include a path converting member 145 that deflects light L1 including the image formed by the display device 121 in a direction toward the observer's pupil. The path converting member 145 may also transfer a real environment (RE) image in front of the observer to the observer's pupil. The path converting member 145 may allow the light L1 including the image formed by the display device 121 and light L2 including the RE image in front of the observer to be transferred to a field of view of the observer.

The path converting member 145 may include a half mirror. A part of the light L1 including the image formed by the display device 121 may be reflected on a half mirror surface 145a and directed to the observer's pupil and a part of the light L2 including the RE image may be transmitted and directed to the observer's pupil.

In addition to the path converting member 145, the transfer optical system 140 may further include another optical member. Although one lens 142 is shown in the figure, this is an example, and additional lenses or a light path control member may be further provided.

The transfer optical system 140 may transfer the light L1 including the image formed by the display device 121 to the observer's pupil together with the light L2 including the RE image, thereby enabling the 3D image display device 100 to function as a see-through type display. The transfer optical system 140 is shown as including one lens 142 and one path converting member 145, but this is an example and is not limited thereto. For example, in addition to the illustrated half mirror, the path converting member 145 may employ an optical window having various shapes and structures capable of transferring the image formed by the display device 121 to the observer's pupil together with the RE image.

The processor 150 may select a representative depth of a 3D image to be output to the observer and control the variable focus optical system 130 such that the focus of the variable focus optical system 130 is formed at a position of the selected representative depth.

The processor 150 may extract the representative depth by analyzing a depth map and a color map with respect to the 3D image. According to an example embodiment, the processor 150 may perform image content analysis and saliency information analysis to extract the representative depth. Also, the processor 150 may quantize depth values included in the depth map into a plurality of predetermined values and may select one or more of the depth values as the representative depth. Also, the processor 150 may select the representative depth through a zone of comfort (ZOC) analysis considering a human visual perception characteristic. One representative depth or a plurality of representative depths may be selected. When the plurality of representative depths are selected, the minimum number of representative depths as possible may be selected considering the ZOC.

The processor 150 may be configured to control the entirety of the 3D image display device 100. For example, the processor 150 may control a light source (not shown) included in the image forming optical system 120 and a modulation signal for modulating light from the light source in the display device 121.

Figure 4:
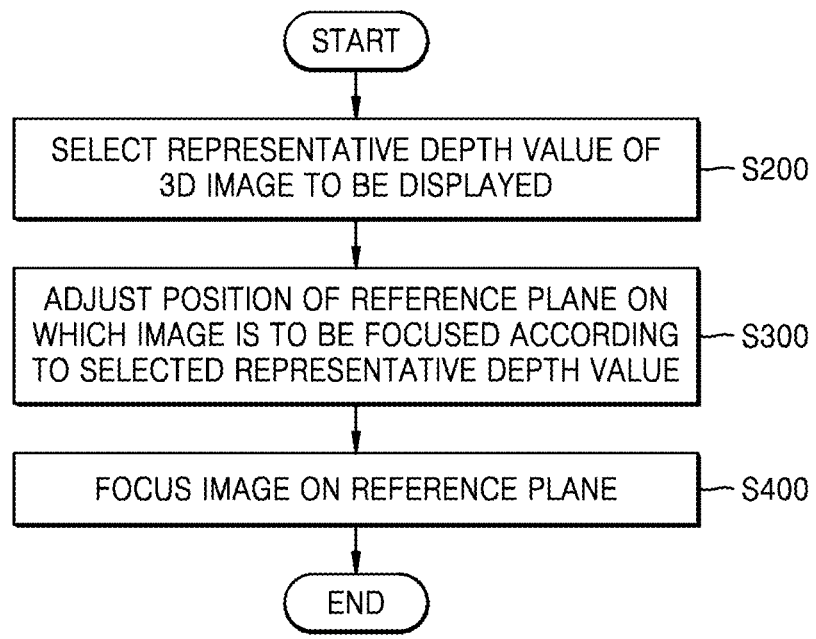
FIG. 4 is a flowchart schematically illustrating a 3D image display method according to an example embodiment.
Figure 5:
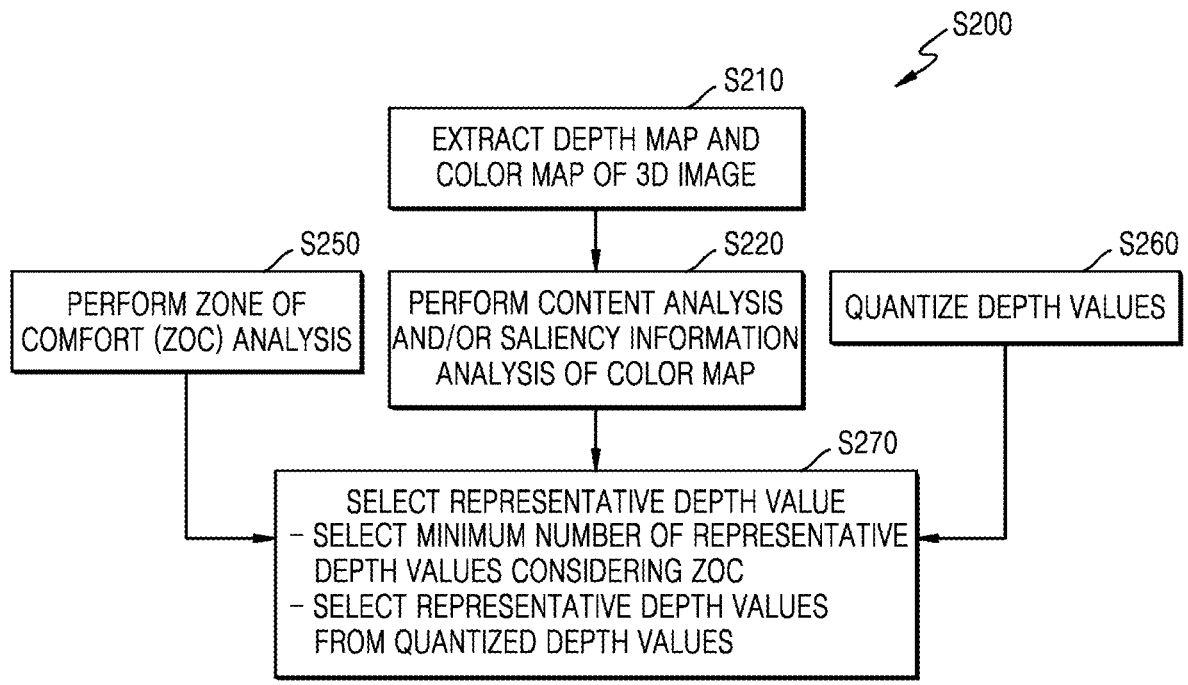
FIG. 5 is a flowchart illustrating an example of a detailed process of selecting a representative depth value in the flowchart of FIG. 4.
Figure 6A:
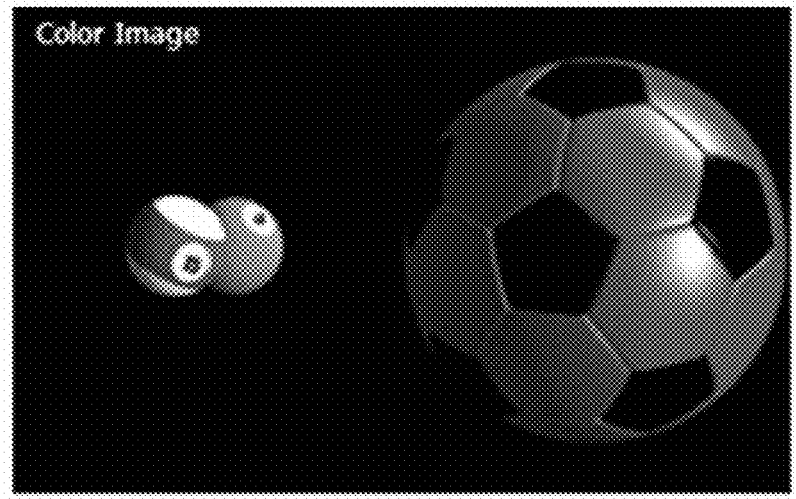
FIGS. 6A and 6B illustrate examples in which a color map and a depth map are extracted and a representative depth is selected according to the flowchart of FIG. 5.
Figure 6B:
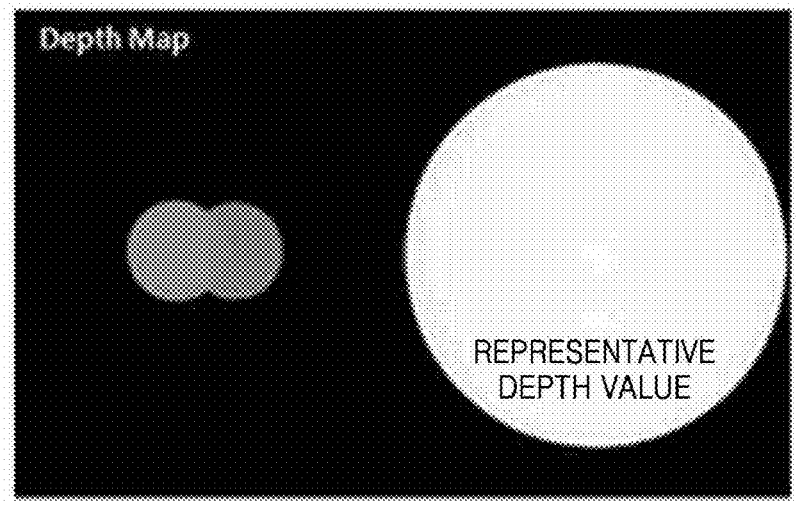

FIG. 4 is a flowchart schematically illustrating a 3D image display method according to an example embodiment. FIG. 5 is a flowchart illustrating an example of a detailed process of selecting a representative depth value in the flowchart of FIG. 4. FIGS. 6A and 6B illustrate examples in which a color map and a depth map are extracted and a representative depth is selected according to the flowchart of FIG. 5.

According to the 3D image display method according to an example embodiment shown in FIG. 4, the representative depth value may be selected with respect to a 3D image to be displayed (S200), and a position of a reference plane on which image is to be focused may be adjusted according to the selected representative depth value (S300). Next, the image may be focused on the selected position of the reference plane (S400).

In the 3D image display method according to an example embodiment, the selection of the representative depth for representing multi-depths may be performed according to image analysis. Therefore, the system configuration may be simplified since an eye tracking sensor for tracking a focus position viewed by an observer is unnecessary.

Referring to FIG. 5, operation (S200) of selecting the representative depth value will be described in detail.

To select the representative depth value, the depth map and the color map may be extracted with respect to the 3D image to be displayed (S210). The color map may be expressed as a color image as shown in FIG. 6A.

Next, content analysis and/or saliency information analysis may be performed on the color map (S220). The saliency information analysis may be performed to select a zone that is likely to be viewed by an observer, that is, a zone with high visual concentration. Brightness, color, contour, object size, etc. may be considered for the selection of the zone with high visual concentration. For example, a zone having a large brightness or color difference compared to surroundings, a zone having a strong contour characteristic, or a zone having a large object size may be the zone with high visual concentration. A depth value corresponding to such a zone may be selected as the representative depth value. Alternatively, a depth value of a position with high visual concentration may be selected as the representative depth value, according to content in the image.

FIG. 6B is a depth map corresponding to the color image of FIG. 6A. FIG. 6B shows a case where a soccer ball having a size larger than that of a baseball is selected as a zone with high visual concentration in the color image of FIG. 6A, and a depth value corresponding to this position is selected as the representative depth value.

For instance, according to an example embodiment, a first zone in the color map of the image having a higher visual concentration than a second zone in the color map of the image is determined as a representative zone, whose position is selected as the representative depth value. The visual concentration information may be one or more of brightness, color, contour, object size, etc. According to an example embodiment, the visual concentration information may be a characteristic of the image that draws the viewers concentration or attention to a particular zone or region in the image.

In addition to the selection of the representative depth value, human visual perception characteristics may be considered. To this end, a ZOC analysis may be performed (S250) and the minimum number of representative depth values may be selected considering the ZOC analysis.

Figure 7:
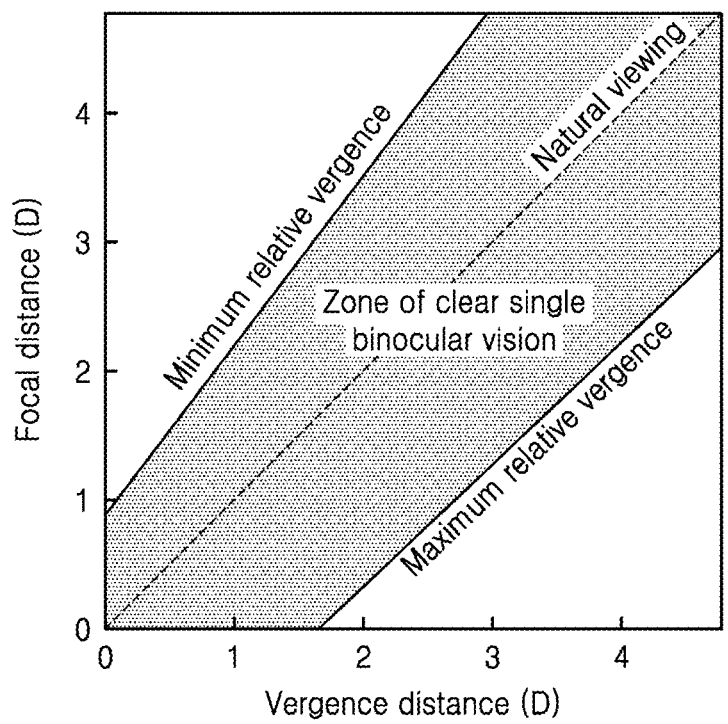
FIG. 7 is a graph of an example of a zone of comfort (ZOC) analysis according to the flowchart of FIG. 5.

FIG. 7 is a graph of an example of a ZOC analysis. In the graph, the horizontal axis represents a vergence distance and the vertical axis represents a focal distance.

Vergence means concentration of visual axes of both eyes on an object to be viewed. When a 3D image is perceived by binocular parallax, vergence is a phenomenon that both eyes converge toward the object to be viewed. Vergence occurs to perceive a single image when binocular parallax exceeds a parallax fusion limit and a double image is experienced. Convergence occurs when the eyes move from a far place to a near place. To the contrary, divergence occurs when the eyes move from a near place to a far place. Accommodation occurs in synchronization with such an action. When the focal distance and a vergence distance coincide with each other, a clear image is recognized. In the human visual perception characteristic, an image of a predetermined range in which the focal distance and the vergence distance do not completely match may be recognized as the clear image. In the graph in FIG. 7, a hatching zone between two straight lines indicated by a minimum relative vergence and a maximum relative vergence is illustrated as a zone where a clear single image is recognized.

Referring to the graph in FIG. 7, for example, a 1 diopter focal plane may account for a vergence distance in the range of 0 to about 2.5 diopters, and a 3 diopter focal plane may account for a vergence distance in the range of about 1.5 diopters to about 4.8 diopters. In this case, even when only two focal planes are used, it may be seen that a vergence position in the range of 0 diopters to about 4.8 diopters may be covered.

Figure 8:
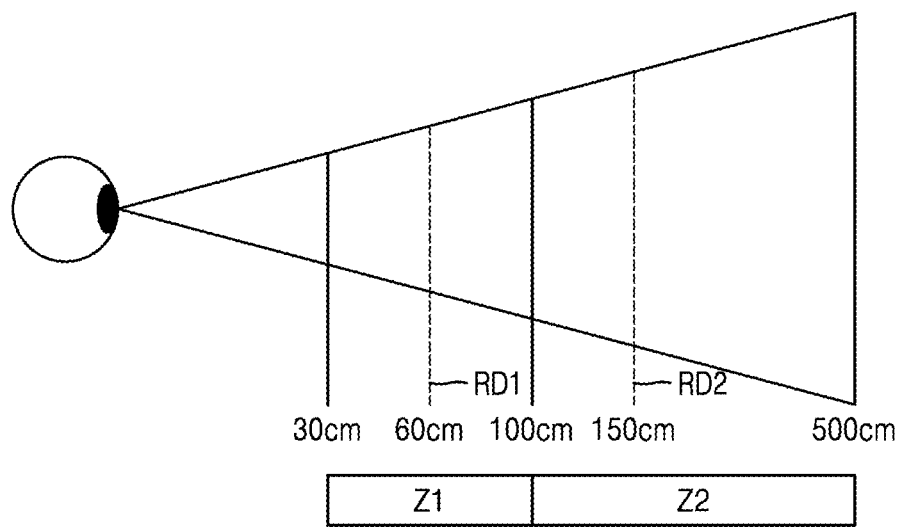
FIG. 8 is a conceptual diagram illustrating an example of selecting the minimum number of representative depth values considering a ZOC.

FIG. 8 is a conceptual diagram illustrating an example of selecting the minimum number of representative depth values considering a ZOC.

For example, considering the ZOC, a depth range of about 30 to about 100 cm may be set as a zone Z1 that covers a predetermined vergence position range, and a depth range of about 100 to about 500 cm may be set as a zone Z2 that covers another predetermined vergence position range. In this case, a depth expression of about 30 to about 500 cm may be expressed as two representative depth values RD1 and RD2 which are respectively selected in the two zones Z1 and Z2.

The representative depth value RD1 may be selected as an arbitrary value in the depth range of about 30 to about 100 cm. The representative depth value RD2 may be selected as an arbitrary value in the depth range of about 100 to about 500. In FIG. 8, 60 cm and 150 cm are selected, but these are examples.

With regard to selection of the representative depth values, the depth values may be quantized (S260) and the representative depth value may be selected from the quantized values (S270).

Figure 9:
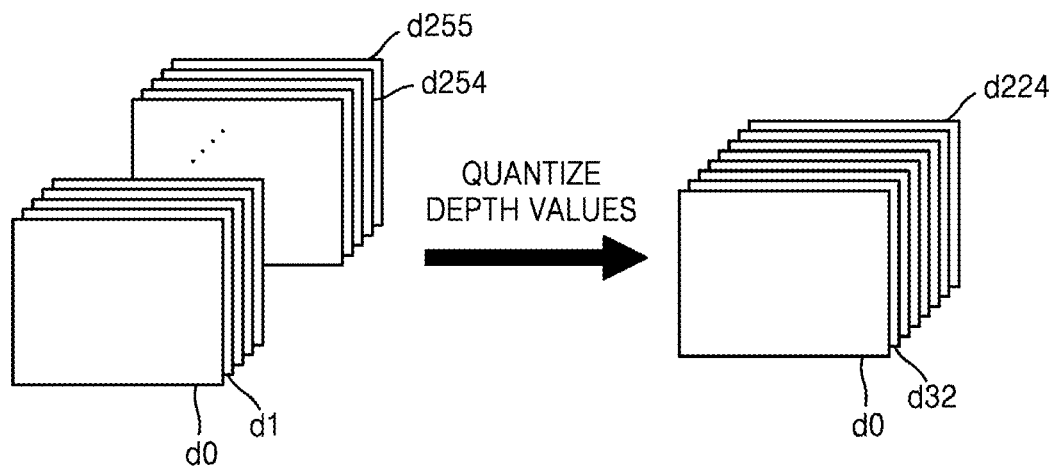
FIG. 9 is a conceptual diagram illustrating an example of quantizing depth values shown in the flowchart of FIG. 5.

FIG. 9 is a conceptual diagram illustrating an example of quantization (S260) of depth values shown in the flowchart of FIG. 5;

Depth information included in a 3D image may be represented as, for example, 256 depth values of 8 bits. Quantization of depth values means that not all of the depth values are used for the depth representation, but some discontinuous values of the depth values are selected for the depth representation. For example, 8 depth values, d0, d32, . . . , d232, may be selected from depth values d0 to d255. However, the 8 depth values here are examples and any value smaller than 256 may be selected. The quantization of depth values described above is intended to reduce the fluctuation of representative depth values selected in successive frames when, for example, a representative depth value is selected for every frame for display of moving pictures. Even when a representative depth value is selected from the depth values before quantization and there is a difference in the representative depth values of successive frames, the same representative depth value may be selected in successive frames when the representative depth value is selected from the quantized values. When the same representative depth value is selected in successive frames, since driving of the variable focus optical system 130 is not required, driving of the 3D image display device 100 may be further simplified.

The representative depth value may be selected considering a ZOC analysis and the quantization of depth values together. For example, in FIG. 8, when an arbitrary depth value in the range of about 30 to about 100 cm in the zone Z1 is selected as the representative depth value RD1, the arbitrary depth value may be selected from quantized values in FIG. 9. Likewise, when an arbitrary depth value in the range of about 100 to about 500 cm in the zone Z2 is selected as the representative depth value, the arbitrary depth value may be selected from values quantized in FIG. 9.

As described above, one representative depth value or the minimum number of representative depth values as possible when there are one or more representative depth values may be selected by reflecting saliency information analysis and/or content analysis together with the ZOC analysis and the quantization of depth values to an image of one frame.

Figure 10:
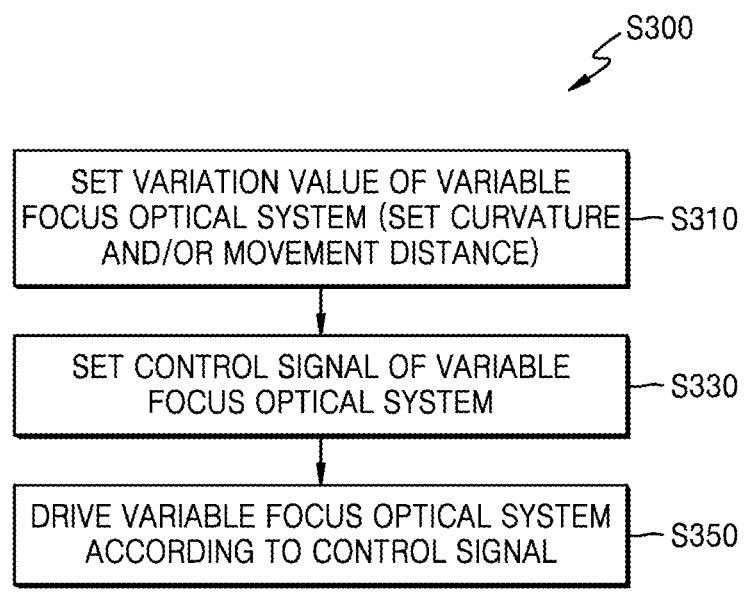
FIG. 10 is a flowchart illustrating an example of a detailed process of adjusting a position of a reference plane in the flowchart of FIG. 4.

FIG. 10 is a flowchart illustrating an example of a detailed process of adjusting (S300) a position of a reference plane in the flowchart of FIG. 4.

When a representative depth value is selected, a variation value of the variable focus optical system 130 may be set according to the representative depth value (S310). The variation value may be the curvature of a lens or a movement distance of the lens according to the configuration of the variable focus optical system 130.

Next, a control signal capable of implementing the variation value (the curvature or the movement distance) may be set (S330). The control signal may be, for example, an electric signal for forming a hydraulic pressure for varying a curvature of the curvature variable lens 131 of FIG. 2 or providing a linear motion force to the driving lens 132 of FIG. 3.

According to the set control signal, the variable focus optical system 130 may be driven to form a focal plane at a predetermined position (S350).

Referring again to FIG. 4, the image may be focused on the wanted reference plane by driving the variable focus optical system 130 (S400). When a plurality of representative depth values are selected in operation (S200) of selecting the representative depth value, operation (S300) of adjusting the position of the reference plane and operation (S400) of focusing the image on the reference plane may be performed using a time division method. The driving of the variable focus optical system 130 and the image formation corresponding to the reference plane in the display device 121 may be synchronized, and the time of one frame may be equally divided as the number of plurality of representative depth values. In an example embodiment, since the representative depth is set to the minimum number even when the plurality of representative depths are set, the high speed driving requirement may be lowered as compared with a case where all depth expressions are performed time-sequentially by using a time-division method.

The 3D image display device described above may be configured in a wearable form. All or some of components of 3D image display devices may be configured in the wearable form.

For example, the 3D image display device may be applied in the form of a head mounted display (HMD). Further, the present disclosure is not limited thereto. The 3D image display device may be applied to a glasses-type display or a goggle-type display.

The 3D image display device described above may be applied to implement AR display in that an image formed in an image forming optical system and an image of the real world are displayed together to an observer.

AR display may further increase the effect of reality by combining and displaying virtual objects or information on an environment of the real world. For example, at a position of the observer, additional information about the environment provided by the real world may be formed by an image former and provided to the observer. The AR display may be applied to a ubiquitous environment or an internet of things (IoT) environment.

The image of the real world is not limited to a real environment and may be, for example, an image formed by another image device. Accordingly, the 3D image display device described above may be applied as a multi-image display device that displays two images together.

The 3D image display device described above may be operatively connected to or linked to another electronic device such as a smart phone. For example, a processor driving a 3D image display device may be provided in the smart phone. In addition, the 3D image display device described above may be included in the smart phone such that the smart phone itself may be used as the 3D image display device.

According to the 3D image display device and method described above, multi-depth may be represented and thus a 3D image without visual fatigue may be formed.

According to the 3D image display device and method described above, the minimum number of selected representative depths may be used for each image frame with regard to representation of the multi-depths, the system driving may be simplified, and the data throughput may be reduced.

According to the 3D image display device and method described above, since the representative depth for representing multi-depths may be selected by image analysis, a separate eye tracking sensor is unnecessary, and thus the system configuration may be simplified.

The 3D image display device and method described above may be easily applied to a wearable device, and may be applied to, for example, a glasses-type AR display device.

Example embodiments have been described and illustrated in the accompanying drawings to help understanding of the disclosure. However, these embodiments are merely examples not limiting the scope of the disclosure. Also, it will be understood that the disclosure is not limited to those illustrated and described in the disclosure. That is, those of ordinary skill in the art may make various modifications therein.

It should be understood that example embodiments described herein should be considered in a descriptive sense only and not for purposes of limitation. Descriptions of features or aspects within each example embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. A three-dimensional (3D) image display device comprising:
    a display device configured to modulate light according to 3D image information to form a 3D image;
    a variable focus optical system configured to focus the 3D image formed by the display device on a reference plane;
    a processor configured to determine a representative depth value of the 3D image by selecting a depth position, from among a plurality of depth positions corresponding to the 3D image, as the representative depth value, and control the variable focus optical system to adjust the reference plane by adjusting a focal point of the variable focus optical system based on the representative depth value; and
    a transfer optical system configured to transfer the 3D image focused on the reference plane to a pupil of an observer;
    wherein the processor is further configured to:
        determine a first zone in a color map of the 3D image having a higher visual concentration than a second zone in the color map of the image as a representative zone, and
        determine the representative depth value by selecting the depth position, from among the plurality of depth positions corresponding to the 3D image, corresponding to the representative zone as the representative depth value.

2. The 3D image display device of claim 1, wherein the processor is further configured to determine the representative depth value based on a depth map and the color map of the 3D image.

3. The 3D image display device of claim 2, wherein the processor is further configured to quantize depth values included in the depth map into a plurality of quantized values and select at least one of the plurality of quantized values as the representative depth value.

4. The 3D image display device of claim 2, wherein the processor is further configured to determine the representative depth value based on saliency information from the color map.

5. The 3D image display device of claim 2, wherein the processor is further configured to determine the representative depth value based on content in the color map.

6. The 3D image display device of claim 1, wherein the processor is further configured to determine a zone range in which a single image is recognized by binocular vergence according to a focal distance and determine the representative depth value based on the zone range.

7. The 3D image display device of claim 1, wherein the variable focus optical system comprises at least one lens adjusted along an optical axis based on the representative depth value such that a distance between the at least one lens and the display device is adjusted.

8. The 3D image display device of claim 1, wherein the variable focus optical system comprises at least one lens having a variable curvature.

9. The 3D image display device of claim 1, wherein the transfer optical system is configured to transfer the 3D image focused on the reference plane to the pupil of the observer together with a real environment image in front of the observer.

10. The 3D image display device of claim 1, wherein the transfer optical system comprises a path converting member configured to deflect a path of the 3D image focused on the reference plane in a direction toward the pupil of the observer.

11. The 3D image display device of claim 10, wherein the path converting member comprises a material configured to transmit a real environment image in front of the observer.

12. The 3D image display device of claim 11, wherein the path converting member comprises a half mirror.

13. The 3D image display device of claim 1, wherein the 3D image display device is a wearable see-through type display device.

14. A three-dimensional (3D) image display method comprising:
    modulating light according to 3D image information to form a 3D image;
    focusing, by a variable focus optical system, the 3D image formed on a reference plane;
    determining a representative depth value of the 3D image by selecting a depth position, from among a plurality of depth positions corresponding to the 3D image, as the representative depth value;
    adjusting the reference plane by adjusting a focal point of the variable focus optical system based on the representative depth value; and
    transfer the 3D image focused on the reference plane to a pupil of an observer,
    wherein the determining the representative depth value comprises:
        determining a first zone in a color map of the 3D image having a higher visual concentration than a second zone in the color map of the image as a representative zone, and
        selecting the depth position, from among the plurality of depth positions corresponding to the 3D image, corresponding to the representative zone as the representative depth value.

15. The 3D image display method of claim 14, wherein the selecting of the representative depth value comprises determining the representative depth value based on a depth map and the color map of the 3D image.

16. The 3D image display method of claim 15, wherein the determining of the representative depth value further comprises:
    quantizing depth values included in the depth map into a plurality of quantized values;
    and selecting at least one of the plurality of quantized values as the representative depth value.

17. The 3D image display method of claim 15, wherein the determining of the representative depth value further comprises determining the representative depth value based on saliency information from the color map.

18. The 3D image display method of claim 15, wherein the determining of the representative depth value further comprises: determining the representative depth value based on content in the color map.

19. The 3D image display method of claim 14, wherein the determining of the representative depth value further comprises:
    determining a zone range in which a single image is recognized by binocular vergence according to a focal distance; and
    determining the representative depth value based on the zone range.

20. The 3D image display method of claim 14, wherein the adjusting of the variable focus optical system comprises adjusting positions of at least one lens in an optical axis or adjusting curvatures of the at least one lens.

21. A three-dimensional (3D) image display device comprising:
    a processor configured to:
        receive image information to form a 3D image, the image information including a color map of the 3D image;
        determine a representative depth value of the 3D image based on the color map of the 3D image, and
        generate a signal to control a variable focus optical system to adjust a reference plane based on the representative depth value,
    wherein the processor is further configured to:
        determine a first zone in the color map of the 3D image having a higher visual concentration than a second zone in the color map of the image as a representative zone, and
        determine the representative depth value by selecting a depth position, from among a plurality of depth positions corresponding to the 3D image, corresponding to the representative zone as the representative depth value.

22. The 3D image display device of claim 21, wherein the processor is further configured to determine the representative depth value by selecting the depth position, from among the plurality of depth positions corresponding to the 3D image, as the representative depth value based on visual concentration information from the color map.

23. The 3D image display device of claim 21, wherein the processor is further configured to:
    determine a plurality of zones of comfort (ZOC) based on a relationship between vergence and focal distance corresponding to the 3D image;
    wherein the determining the representative depth value comprises determining a first representative depth value for a first ZOC and a second representative depth value for a second ZOC.

24. The 3D image display device of claim 1, wherein the 3D image at a first depth position having a higher visual concentration than the 3D image at a second depth position, from among the plurality of depth positions, is determined as the representative depth value.

25. The 3D image display device of claim 1, wherein adjusting the focal point of the variable focus optical system comprises changing a physical characteristic related to the variable focus optical system based on the representative depth value.

26. The 3D image display device of claim 1, the processor is further configured to determine a number of the representative depth value as one with respect to one frame of the 3D image.

* * * * *